(12) United States Patent
Moon

(10) Patent No.: US 12,011,886 B2
(45) Date of Patent: Jun. 18, 2024

(54) CARBON FRAME AND MANUFACTURING METHOD THEREFOR

(71) Applicant: GET2GET.COM, Seoul (KR)

(72) Inventor: Eui Bae Moon, Bucheon-si (KR)

(73) Assignee: GET2GET.COM, Seoul (KR)

( * ) Notice: Subject to any disclaimer, the term of this patent is extended or adjusted under 35 U.S.C. 154(b) by 335 days.

(21) Appl. No.: 17/602,544

(22) PCT Filed: May 20, 2020

(86) PCT No.: PCT/KR2020/006608
§ 371 (c)(1),
(2) Date: Oct. 8, 2021

(87) PCT Pub. No.: WO2021/071046
PCT Pub. Date: Apr. 15, 2021

(65) Prior Publication Data
US 2022/0168972 A1 Jun. 2, 2022

(30) Foreign Application Priority Data
Oct. 7, 2019 (KR) .......................... 10-2019-0123560

(51) Int. Cl.
*B29C 70/34* (2006.01)
*B29K 27/06* (2006.01)
*B29K 105/08* (2006.01)
*B29L 12/00* (2006.01)

(52) U.S. Cl.
CPC ........ *B29C 70/345* (2013.01); *B29K 2027/06* (2013.01); *B29K 2105/0872* (2013.01); *B29L 2012/00* (2013.01)

(58) Field of Classification Search
CPC .............. B29C 70/345; B29K 2027/06; B29K 2105/0872; B29L 2012/00
See application file for complete search history.

(56) References Cited

U.S. PATENT DOCUMENTS

2007/0222178 A1* 9/2007 Davis ..................... B62K 19/16
280/281.1

FOREIGN PATENT DOCUMENTS

| JP | 11-192991 A | 7/1999 |
| JP | 3408579 B2 | 5/2003 |
| JP | 2007-161238 A | 6/2007 |
| KR | 10-0145656 B1 | 8/1998 |
| KR | 10-1747109 B1 | 6/2017 |

OTHER PUBLICATIONS

Machine translation of JP 11-92991 A; Publication date: Jul. 21, 1999.*

* cited by examiner

*Primary Examiner* — Vishal I Patel
(74) *Attorney, Agent, or Firm* — NKL Law; Jae Youn Kim

(57) ABSTRACT

Proposed are a carbon frame and a method of manufacturing the same capable of improving torsional stiffness. The method includes the steps of: (a) preparing at least two forms; (b) wrapping up the forms with vinyl sheets; (c) laminating carbon prepregs on the vinyl sheets; (d) combining the forms to put the combined forms in a mold; and (e) injecting heat and wind into the vinyl sheets.

2 Claims, 3 Drawing Sheets

CARBON FRAME AND MANUFACTURING METHOD THEREFOR

TECHNICAL FIELD

The present invention relates to a carbon frame and a manufacturing method therefor, and more particularly, to a carbon frame and a method of manufacturing the same, capable of improving torsional stiffness.

BACKGROUND ART

In general, frames are structural members for maintaining shapes of a machine, an apparatus, and a device, and are formed of various materials such as a wood, a metal, a plastic, and so on. Especially, frames formed of a carbon material having light weight and excellent strength have recently been developed and applied to various fields.

For example, in the case of a bicycle, reducing weight is estimated as an important factor for convenience of movement, transport, and safekeeping, and thus a carbon frame is being applied so far. However, since the carbon frame is expensive, the carbon frame is generally partly applied only to an expensive product group or a main frame subjected to the heaviest load.

In the main frame, loads are applied to a saddle, a handle, etc. in different directions. That is, user's weight applied to the saddle, user's weight and a pulling force applied to the handle, and so on strongly press an upper end of the main frame. However, because the carbon frame has a flexible characteristic, a torsional load applied during pedaling may become a bigger problem.

For this reason, an attempt to improve torsional stiffness of the carbon frame is continuously made, but a solution thereof is not yet found.

DISCLOSURE

Technical Problem

The present invention has been made to solve the problems of the above-described related art and an object thereof is to provide a carbon frame and a method of manufacturing the same, capable of improving torsional stiffness.

Technical Solution

As a solution for solving the above-described technical problem,
the present invention provides a method of manufacturing a carbon frame, which includes the steps of: (a) preparing at least two forms; (b) wrapping up the forms with vinyl sheets; (c) laminating carbon prepregs on the vinyl sheets; (d) combining the forms to put the combined forms in a mold; and (e) injecting heat and wind into the vinyl sheets.

In this case, the method of manufacturing a carbon frame may further include bonding a connected portion between the forms.

In this case, the prepregs laminated above the forms may have directivities different from each other.

Further, the present invention provides a carbon frame manufactured by the above-described method.

Advantageous Effects

According to the present invention, at least two frames are combined into one carbon frame, and thereby a load can be effectively distributed.

Further, a partition is formed at a portion where the frames are connected, and thereby the frames can be prevented from being twisted.

In addition, carbon prepregs of the frames have directivities different from each other, and thus can withstand loads applied in various directions.

Furthermore, torsional stiffness of each frame is improved due to the above-described various effects, and thus the carbon frame is expected to be able to be applied to bicycles as well as military wares requiring more excellent stiffness.

MODES FOR CARRYING OUT INVENTION

Figure 1:
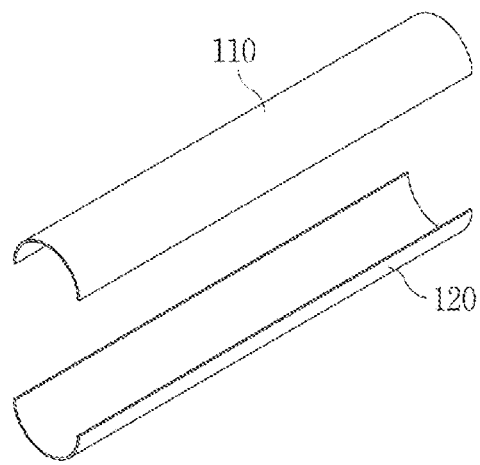
FIGS. 1 to 4 are views illustrating a process of manufacturing a carbon frame according to an exemplary embodiment of the present invention.
Figure 2:
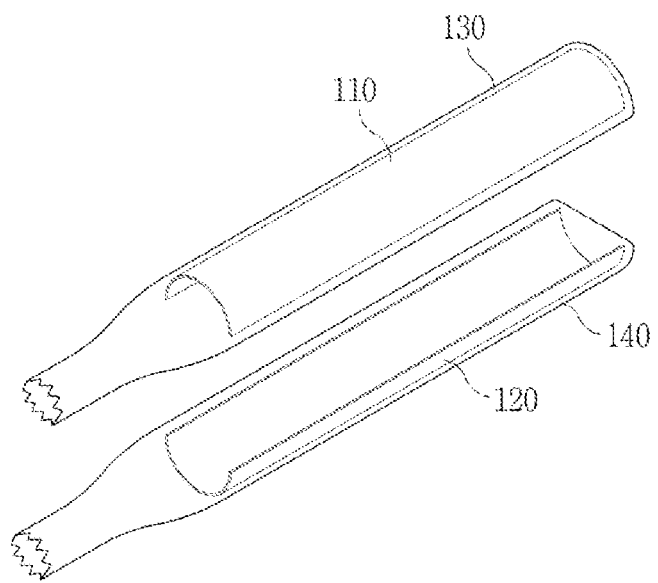
Figure 3:
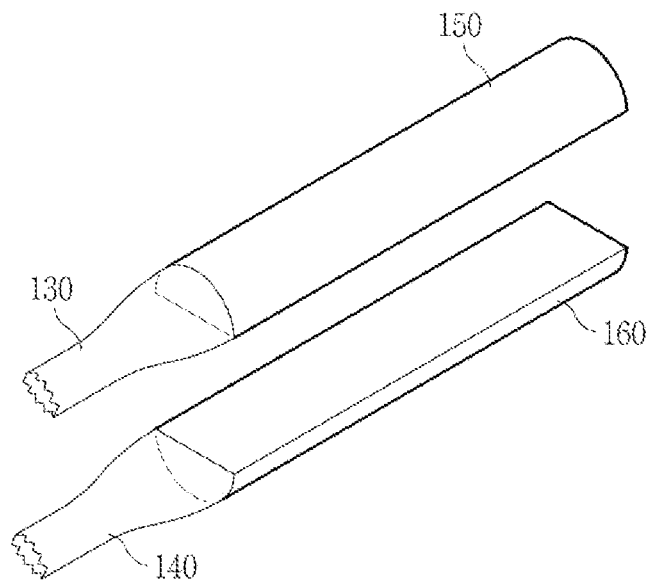
Figure 4:
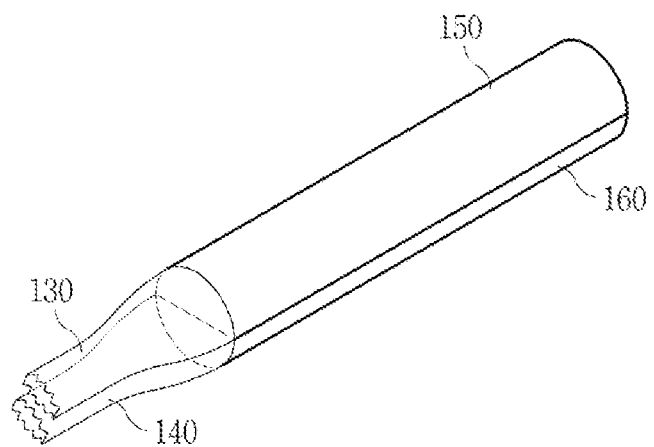

Hereinafter, the embodiments of the present invention will be described in detail with reference to the accompanying drawings so as to be easily implemented by those skilled in the art to which the present invention pertains. However, the present invention may be variously implemented and is not limited to the embodiments described herein. In the drawings, in order to clearly describe the present invention, portions which are not related to the description of the present invention will be omitted and similar portions are denoted by similar reference numerals throughout the specification.

Figure 5:
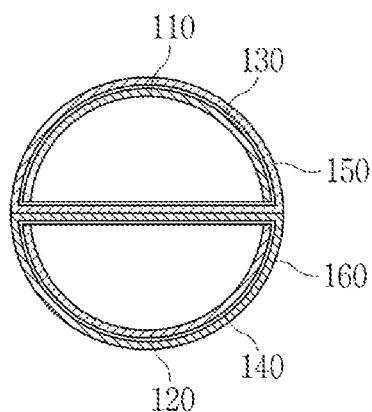
FIG. 5 is a sectional view of forms illustrated in FIG. 4.
Figure 6:
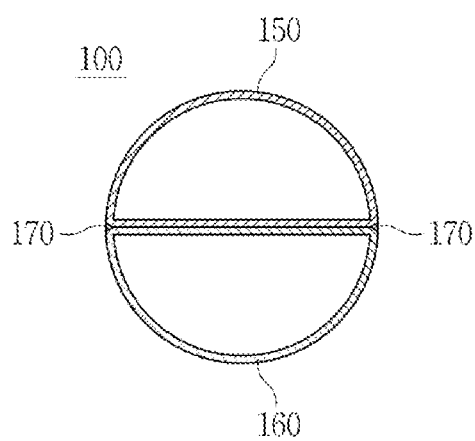
FIG. 6 is a sectional view of a carbon frame according to an exemplary embodiment of the present invention.

FIGS. 1 to 4 are views illustrating a process of manufacturing a carbon frame according to an exemplary embodiment of the present invention. FIG. 5 is a sectional view of forms illustrated in FIG. 4. FIG. 6 is a sectional view of a carbon frame according to an exemplary embodiment of the present invention.

Referring to FIGS. 1 to 6, a carbon frame 100 according to an exemplary embodiment of the present invention is manufactured using forms.

The forms may be formed of expanded polystyrene (EPS) as means for disposing carbon prepregs 150 and 160 in a mold (not illustrated).

The present invention is technically characterized by using at least two forms having the same shape as the carbon frame 100 in a state combined to each other. Here, a process of manufacturing the carbon frame 100 using two forms, i.e. a first form 110 and a second form 120 will be described by way of example.

The first form 110 and the second form 120 have a semicircular section structure and can provide a circular section structure in a state combined to each other. The section structure formed by the first form 110 and the second form 120 may be of a circular shape as well as an oval shape, a polygonal shape, or an irregular shape in which a round portion and an angular portion are mixed according to a shape of the carbon frame 100, and is not particularly limited.

Further, here, a shape in which one side of the form is open will be described by way of example. However, one side of the form is not necessarily open. Of course, one side of the form may have a closed shape along with the other side of the foam.

Meanwhile, when the carbon frame 100 is manufactured using three foams to realize required performance of the carbon frame 100 unlike the present embodiment, the forms having a section structure of an arc whose central angle is 120 degrees may be used. When the carbon frame 100 is manufactured using four foams, the forms having a section structure of an arc whose central angle is 90 degrees may be used. In the same way, five or more forms may be used.

When the first form 110 and the second form 120 are prepared, the first form 110 and the second form 120 are wrapped up with vinyl sheets 130 and 140. The vinyl sheets 130 and 140 are used to separate the carbon prepregs 150 and 160 (to be described below) from the first and second forms 110 and 120 and come into close contact with the mold.

Afterwards, the carbon prepregs 150 and 160 are laminated on the vinyl sheets 130 and 140. At this time, the carbon prepregs 150 and 160 are laminated in multiple layers in consideration of the required performance of the carbon frame 100. In this case, the carbon prepregs 150 and 160 may be laminated to have directivities different from each other.

Next, the first and second forms 110 and 120 on which the carbon prepregs 150 and 160 are laminated are combined and inserted into a lower mold, and after an upper mold is coupled, heat and wind are injected into the vinyl sheets 130 and 140.

When high-temperature air is injected into the vinyl sheets 130 and 140, the air expands the vinyl sheets 130 and 140 in an outward direction while entering between the forms 110 and 120 and the vinyl sheets 130 and 140. For this reason, the carbon prepregs 150 and 160 laminated on the vinyl sheets 130 and 140 are molded by high-temperature heat while being pressed toward inner walls of the molds.

Finally, when the upper mold is separated from the lower mold, a molding is extracted, and the forms 110 and 120 and the vinyl sheets 130 and 140 are removed, the carbon frame 100 having a circular section structure as illustrated in FIG. 6 is obtained. The carbon prepreg 150 adjacent to an opening of the first form 110 and the carbon prepreg 160 adjacent to an opening of the second form 120 are connected and molded in the obtained carbon frame 100, and thereby a partition structure is formed. In this case, a resin adhesive 170 is applied to opposite ends of the connected portion between the carbon prepreg 150 and the other carbon prepreg 160 so as to be able to reinforce a bonding force.

As described above, the carbon frame 100 is manufactured to have a shape in which two frames are combined into one, and thus torsional stiffness can be improved. For example, the carbon frame 100 of the present invention may be adopted as a main frame of a bicycle. In this case, when torsional loads are applied to the main frame by pedaling of a user, the two frames constituting the carbon frame 100 absorb the loads while being elastically deformed, and thus a load distribution effect can be obtained. Furthermore, since the carbon prepreg 150 and the carbon prepreg 160 in the present invention have directivities different from each other, even if loads are applied in several directions like the main frame of the bicycle, the loads can be effectively distributed.

However, even if the two frames distribute the loads, and when a torsional load over the elastic stress which each frame has is applied, the frames are damaged after all. However, in the present invention, the two frames are connected by the partition, and this partition curbs the torsion of the frames. Thus, the frames can be prevented from being damaged.

Further, the portion where the two frames are connected is reinforced by the partition, the partition has a structure in which the carbon prepregs 150 and 160 having directivities different from each other are in contact with each other, and thus a reinforced force acts on the partition as well as an outer wall of the carbon frame 100.

While the exemplary embodiments of the present invention have been described above in detail with reference to the drawings, the description of the present invention is merely illustrative, and it can be understood by those skilled in the art to which the present invention pertains that the present invention can be easily modified in other specific forms without changing the technical spirit or essential features of the present invention.

Accordingly, the scope of the present invention shall be determined only by the appended claims rather than the above detailed description, and it should be interpreted that all alterations or modifications derived from the meaning, scope and their equivalent concepts defined in the claims are included in the scope of the present invention.

DESCRIPTION OF REFERENCE NUMERALS

100: Carbon frame 110: First form
120: Second form 130, 140: Vinyl sheet
150, 160: Carbon prepreg 170: Resin adhesive

The invention claimed is:

1. A method of manufacturing a carbon frame comprising the steps of:
    preparing at least two forms, wherein each of the at least two forms comprises an opening;
    wrapping up the forms with vinyl sheets;
    laminating carbon prepregs on the vinyl sheets;
    combining the forms, such that openings of the at least two forms face each other;
    putting the combined forms in a mold;
    injecting heat and wind into the vinyl sheets; and
    bonding a connected portion between the carbon prepregs,
    wherein:
    the carbon prepregs laminated on the vinyl sheets are pressed to an inner wall of the mold;
    the carbon prepregs laminated on the vinyl sheets on the opening of each of the at least two forms are connected to each other to form a partition structure; and
    the prepregs laminated above the forms have directivities different from each other.

2. A carbon frame manufactured by the method according to claim 1.